United States Patent
Asaoka et al.

(10) Patent No.: US 11,002,340 B2
(45) Date of Patent: May 11, 2021

(54) AUTOMATIC TRANSMISSION (71) Applicant: TOYOTA JIDOSHA KABUSHIKI KAISHA, Toyota (JP)

(72) Inventors: Hironori Asaoka, Numazu (JP); Atsushi Honda, Seto (JP); Motoki Tabuchi, Mishima (JP); Daisuke Okamoto, Fujinomiya (JP); Naoyuki Kishimoto, Susono (JP); Tomoe Osada, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 16/035,148

(22) Filed: Jul. 13, 2018

(65) Prior Publication Data
US 2019/0078661 A1   Mar. 14, 2019

(30) Foreign Application Priority Data

Sep. 8, 2017   (JP) .............................. JP2017-173128

(51) Int. Cl.
*F16H 3/66*   (2006.01)
*F16H 37/04*  (2006.01)
(Continued)

(52) U.S. Cl.
CPC ............. *F16H 3/663* (2013.01); *F16H 3/095* (2013.01); *F16H 37/046* (2013.01);
(Continued)

(58) Field of Classification Search
CPC ...... F16H 3/66; F16H 2200/201; F16H 3/663; F16H 2200/2023; F16H 3/091; F16H 3/095; F16H 2037/048; F16H 37/08
See application file for complete search history.

(56) References Cited

U.S. PATENT DOCUMENTS 4,916,977 A * 4/1990 Aoki ................... F16H 3/663
                                                  475/205
5,203,749 A * 4/1993 Ito .................... B60K 17/06
                                                  475/204
(Continued)

FOREIGN PATENT DOCUMENTS

| JP | H05-288249 A | 11/1993 |
|----|--------------|---------|
| JP | 2015-078765 A | 4/2015 |
| JP | 2017-032036 A | 2/2017 |

OTHER PUBLICATIONS

Machine translation of JP H05-288249, retrieved from www.espacenet.com (Year: 2020).*

*Primary Examiner* — Stacey A Fluhart
(74) *Attorney, Agent, or Firm* — Oliff PLC (57) ABSTRACT

An automatic transmission includes a main transmission and an auxiliary transmission. The auxiliary transmission includes an auxiliary-transmission-side planetary gear mechanism, a first clutch, and a second clutch. The auxiliary-transmission-side planetary gear mechanism is provided between a pair of main-transmission-side planetary gear mechanisms, and a part of the auxiliary-transmission-side planetary gear mechanism is located within the main transmission. The first clutch fixes rotation of a sun gear of the auxiliary-transmission-side planetary gear mechanism. The second clutch connects a ring gear of the auxiliary-transmission-side planetary gear mechanism with the sun gear.

3 Claims, 4 Drawing Sheets

(51) Int. Cl.
*F16H 3/095* (2006.01)
*F16H 61/04* (2006.01)
*F16H 61/10* (2006.01)

(52) U.S. Cl.
CPC ......... *F16H 61/0437* (2013.01); *F16H 61/10* (2013.01); *F16H 2200/006* (2013.01); *F16H 2200/0052* (2013.01); *F16H 2200/0069* (2013.01); *F16H 2200/0078* (2013.01); *F16H 2200/0086* (2013.01); *F16H 2200/201* (2013.01); *F16H 2200/2007* (2013.01); *F16H 2200/2023* (2013.01); *F16H 2200/2094* (2013.01); *F16H 2200/2097* (2013.01)

(56) References Cited

U.S. PATENT DOCUMENTS

| | | | | | |
|---|---|---|---|---|---|
| 5,213,552 | A | * | 5/1993 | Ito | F16H 3/66 475/276 |
| 5,667,451 | A | * | 9/1997 | Park | F16H 47/085 475/44 |
| 5,700,223 | A | * | 12/1997 | Park | F16H 3/663 475/204 |
| 5,743,825 | A | * | 4/1998 | Park | F16H 3/663 475/278 |
| 5,769,749 | A | * | 6/1998 | Funahashi | F16H 3/66 475/276 |
| 7,198,586 | B2 | * | 4/2007 | Brooks | F16H 3/66 475/276 |
| 7,311,634 | B2 | * | 12/2007 | Shim | F16H 3/663 475/275 |
| 2018/0100568 | A1 | * | 4/2018 | Kim | F16H 3/66 |

\* cited by examiner

AUTOMATIC TRANSMISSION

INCORPORATION BY REFERENCE

The disclosure of Japanese Patent Application No. 2017-173128 filed on Sep. 8, 2017 including the specification, drawings and abstract is incorporated herein by reference in its entirety.

BACKGROUND

1. Technical Field

The disclosure relates to an automatic transmission.

2. Description of Related Art

In recent years, the number of speeds or gear positions of an automatic transmissions installed on a vehicle has been increasing, for improvement of the fuel efficiency of the vehicle. For example, an automatic transmission disclosed in Japanese Unexamined Patent Application Publication No. 5-288249 (JP 5-288249 A) includes a main transmission having two planetary gear mechanisms, and an auxiliary transmission having one planetary gear mechanism and disposed on an axis different from that of the main transmission. The automatic transmission forms forward first-speed gear position to forward sixth-speed gear position, and a reverse gear position, by selectively engaging or releasing frictional engagement elements, such as clutches and brakes.

SUMMARY

However, in the automatic transmission disclosed in JP 5-288249 A, one of the planetary gear mechanisms of the main transmission, and the planetary gear mechanism of the auxiliary transmission, are aligned with each other in a radial direction, and the radial size of the automatic transmission is increased, thus making it difficult to reduce the size of the automatic transmission.

This disclosure provide an automatic transmission that is reduced in size.

One aspect of the disclosure is concerned with an automatic transmission. The automatic transmission includes a main transmission including a plurality of main-transmission-side planetary gear mechanisms, and an auxiliary transmission having a rotational axis that is different from a rotational axis of the main transmission. The auxiliary transmission includes an auxiliary-transmission-side planetary gear mechanism, a first clutch, and a second clutch. The auxiliary-transmission-side planetary gear mechanism includes a sun gear, a ring gear configured to receive power from the main transmission, and a carrier configured to deliver the power. The auxiliary-transmission-side planetary gear mechanism is provided between a pair of main-transmission-side planetary gear mechanisms included in the plurality of main-transmission-side planetary gear mechanisms and located adjacent to each other in a direction of the rotational axis of the main transmission, and a part of the auxiliary-transmission-side planetary gear mechanism is located within the main transmission. The first clutch is configured to the sun gear of the auxiliary-transmission-side planetary gear mechanism. The second clutch is configured to connect the ring gear with the sun gear.

With the above arrangement, the radial size of the auxiliary transmission can be reduced, as compared with the case where the main-transmission-side planetary gear mechanism and the auxiliary-transmission-side planetary gear mechanism are aligned with each other, and a part of the auxiliary-transmission-side planetary gear mechanism is not located within the main transmission. Accordingly, the size of the automatic transmission can be reduced.

In the automatic transmission, the auxiliary-transmission-side planetary gear mechanism may be located between a counter gear pair and a final gear pair in the direction of the rotational axis of the auxiliary transmission.

With the above arrangement, it is possible to save space for a power transmission path from the counter gear pair to the final gear pair via the auxiliary-transmission-side planetary gear mechanism.

The automatic transmission may further include a Low-High switching mechanism configured to switch the auxiliary transmission between a Low mode and a High mode, by selectively releasing the first clutch and the second clutch. The Low-High switching mechanism may be configured to switch the auxiliary transmission between the Low mode and the High mode when a gear position of the automatic transmission is a 6th-speed gear position. The gear position of the automatic transmission may be set to one gear position selected from 1st-speed to 6th-speed gear positions when the auxiliary transmission is in the Low mode, and may be set to one gear position selected from 6th-speed to 10th-speed gear positions when the auxiliary transmission is in the High mode.

With the above arrangement, it is possible to realize a ten-speed automatic transmission, while reducing the size of the automatic transmission.

In the automatic transmission, the main transmission may be configured to set one of a forward 1st-speed gear position to a forward 8th-speed gear position, and a reverse gear position, as a gear position.

With the above arrangement, it is possible to realize an eight-speed automatic transmission, while reducing the size of the automatic transmission.

The automatic transmission may further include a Low-High switching mechanism configured to switch the auxiliary transmission between a Low mode and a High mode, by selectively releasing the first clutch and the second clutch. The Low-High switching mechanism may be configured to alternately switch the auxiliary transmission between the Low mode and the High mode, so as to shift a gear position of the automatic transmission to an adjacent gear position.

With the above arrangement, the size of the auxiliary-transmission-side planetary gear mechanism is less likely or unlikely to be increased, and it is possible to shift the automatic transmission, without largely changing the gear ratio in the auxiliary-transmission-side planetary gear mechanism.

In the automatic transmission, each of the first clutch and the second clutch may be a dog clutch.

With the above arrangement, it is possible to reduce a dragging loss, which could arise when the first clutch and the second clutch are provided by frictional engagement elements.

The automatic transmission may further include an electric actuator configured to switch the dog clutch between an engaged state and a released state.

With the above arrangement, no current needs to be passed through the electric actuator, except when switching operation is performed to engage or release the dog clutch. Therefore, saving of energy can be achieved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An automatic transmission as a first embodiment of the disclosure will be described. It is to be understood that the disclosure is not limited to this embodiment.

Figure 1:
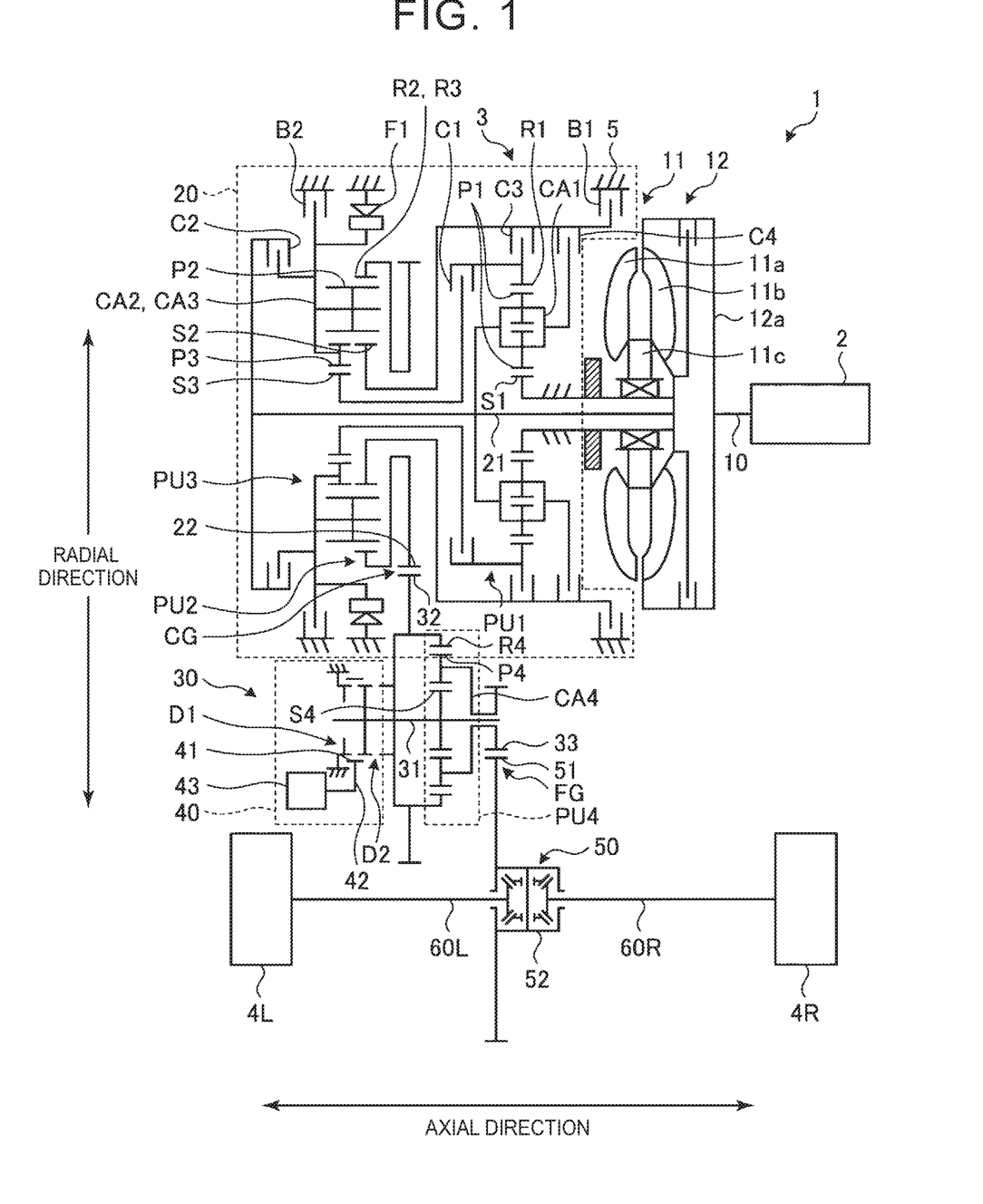
FIG. 1 is a skeleton diagram of a vehicle including an automatic transmission according to one embodiment.

FIG. 1 is a skeleton diagram of a vehicle 1 including an automatic transmission 3 according to the embodiment. The vehicle 1 of this embodiment is an FF (front-engine, front-drive) type vehicle, and includes an engine 2, automatic transmission 3, front wheels 4L, 4R, and so forth. The vehicle 1 may be an RR (rear-engine, rear-drive) type vehicle.

The automatic transmission 3 includes an input shaft 10, torque converter 11, lock-up clutch 12, main transmission 20, auxiliary transmission 30, differential unit 50, a case 5 that houses these components, and so forth. The input shaft 10 is coupled to a crankshaft (not shown) of the engine 2. The torque converter 11 has a pump impeller 11a connected to the input shaft 10, a turbine runner 11b to which rotation of the pump impeller 11a is transmitted via oil as a working fluid, and a stator 11c that is disposed between the pump impeller 11a and the turbine runner 11b such that its rotation is restricted to one direction by a one-way clutch (not shown). The turbine runner 11b is connected to an input shaft 21 of the main transmission 20, which has the same axis as the input shaft 10. The lock-up clutch 12 directly couples a front cover 12a with the input shaft 21 when it is engaged, so as to place the torque converter 11 in a locked-up state.

The main transmission 20 is a planetary gear type multi-speed automatic transmission that forms a plurality of gear positions having different speed ratios, by selectively engaging or releasing first clutch C1 to fourth clutch C4, first brake B1 and second brake B2, and a one-way clutch F1, as a plurality of frictional engagement elements. The main transmission 20 also has a double-pinion type first planetary gear mechanism PU1, and a single-pinion type second planetary gear mechanism PU2 and a double-pinion type third planetary gear mechanism PU3 that constitute a Ravignawx type planetary gear train, such that these planetary gear mechanisms PU1, PU2, PU3 are arranged on the same axis. The main transmission 20 is operable to change the speed of rotation of the input shaft 21, and deliver the rotation from a counter drive gear 22. The counter drive gear 22 is connected to the differential unit 50 via the auxiliary transmission 30.

The first planetary gear mechanism PU1 has a first sun gear S1 as an externally toothed gear, a first ring gear R1 as an internally toothed gear disposed concentrically with the first sun gear S1, first pinion gears P1 comprised of a pair of gear pairs, which mesh with the first sun gear S1 and the first ring gear R1, and a first carrier CA1 that supports the first pinion gears P1 such that the gears P1 can rotate about themselves and about the axis of the first planetary gear mechanism PU1.

The second planetary gear mechanism PU2 has a second sun gear S2 as an externally toothed gear, a second ring gear R2 as an internally toothed gear disposed concentrically with the second sun gear S2, second pinion gears P2 that mesh with the second sun gear S2 and the second ring gear R2, and a second carrier CA2 that supports the second pinion gears P2 such that the gears P2 can rotate about themselves and about the axis of the second planetary gear mechanism PU2.

The third planetary gear mechanism PU3 has a third sun gear S3 as an externally toothed gear, a third ring gear R3 as an internally toothed gear disposed concentrically with the third sun gear S3, third pinion gears P3 comprised of a pair of gear pairs, which mesh with the third sun gear S3 and the third ring gear R3, and a third carrier CA3 that supports the third pinion gears P3 such that the gears P3 can rotate about themselves and about the axis of the third planetary gear mechanism PU3.

The first clutch C1 to fourth clutch C4, first brake B1, and the second brake B2 as the frictional engagement elements are in the form of wet multiple disc clutches or brakes that are pressed by hydraulic actuators, band brakes that are tightened by hydraulic actuators, or the like.

The auxiliary transmission 30 consists of a countershaft 31 parallel to the input shaft 21 of the main transmission 20, a counter driven gear 32 that meshes with the counter drive gear 22 of the main transmission 20, a fourth planetary gear mechanism PU4 provided on the same axis as the countershaft 31, a Low-High switching mechanism 40, a final drive gear 33, and so forth. Rotation which the counter driven gear 32 receives from the counter drive gear 22 of the main transmission 20 is transmitted to the final drive gear 33, via the countershaft 31 and the fourth planetary gear mechanism PU4. The final drive gear 33 meshes with a final driven gear 51 of the differential unit 50, and rotation transmitted from the final drive gear 33 to the final driven gear 51 is delivered to axles 60L, 60R of the front wheels 4L, 4R, via a differential gear 52.

In the automatic transmission 3 according to this embodiment, the auxiliary transmission 30 and the main transmission 20 are provided on different axes, so that the width of the automatic transmission 3 in the direction of the rotational axis (axial direction) can be reduced, as compared with the case where the main transmission 20 and the auxiliary transmission 30 are provided on the same axis.

Figure 2:
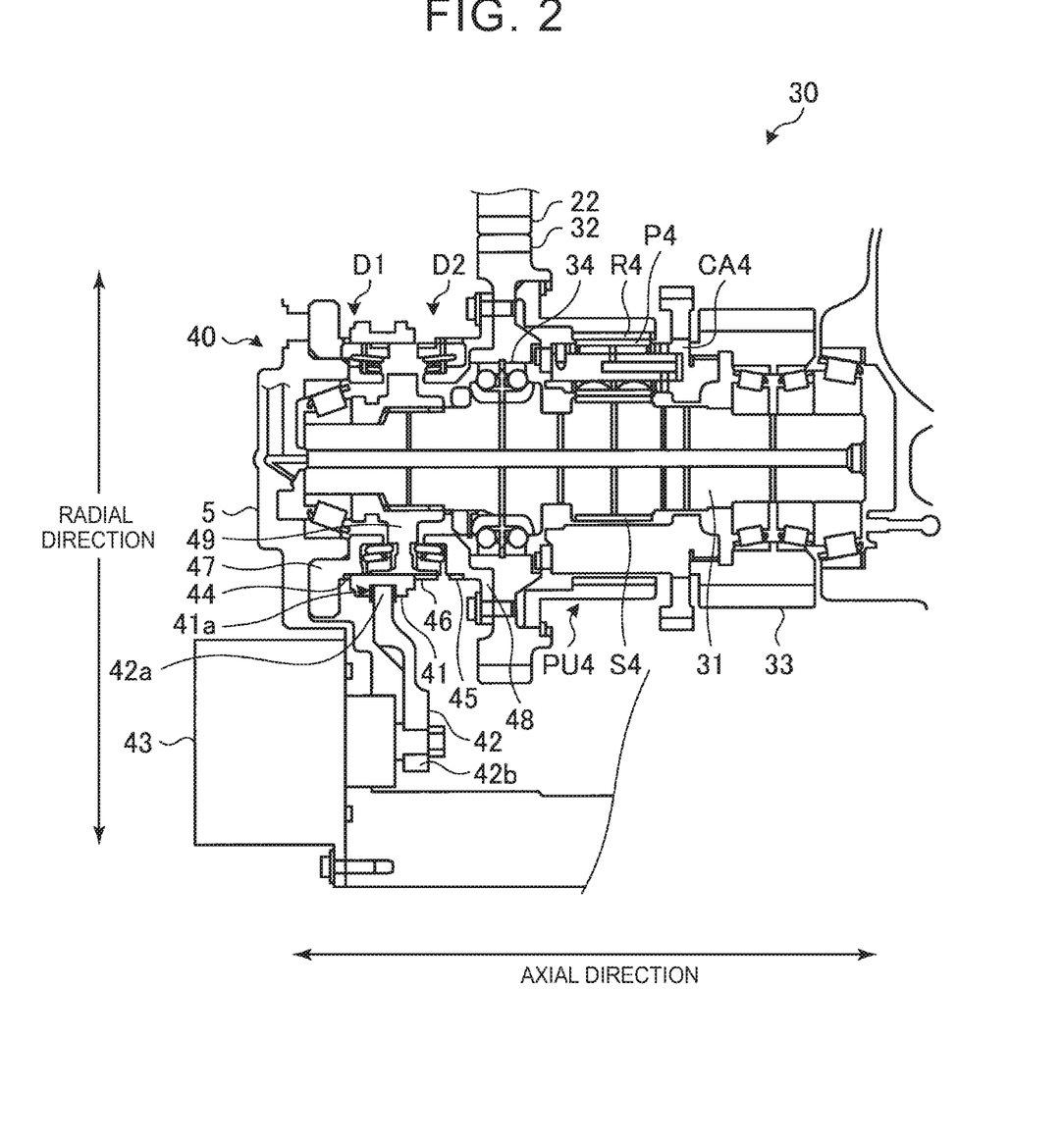
FIG. 2 is an enlarged view of an auxiliary transmission when it is in a Low mode.
Figure 3:
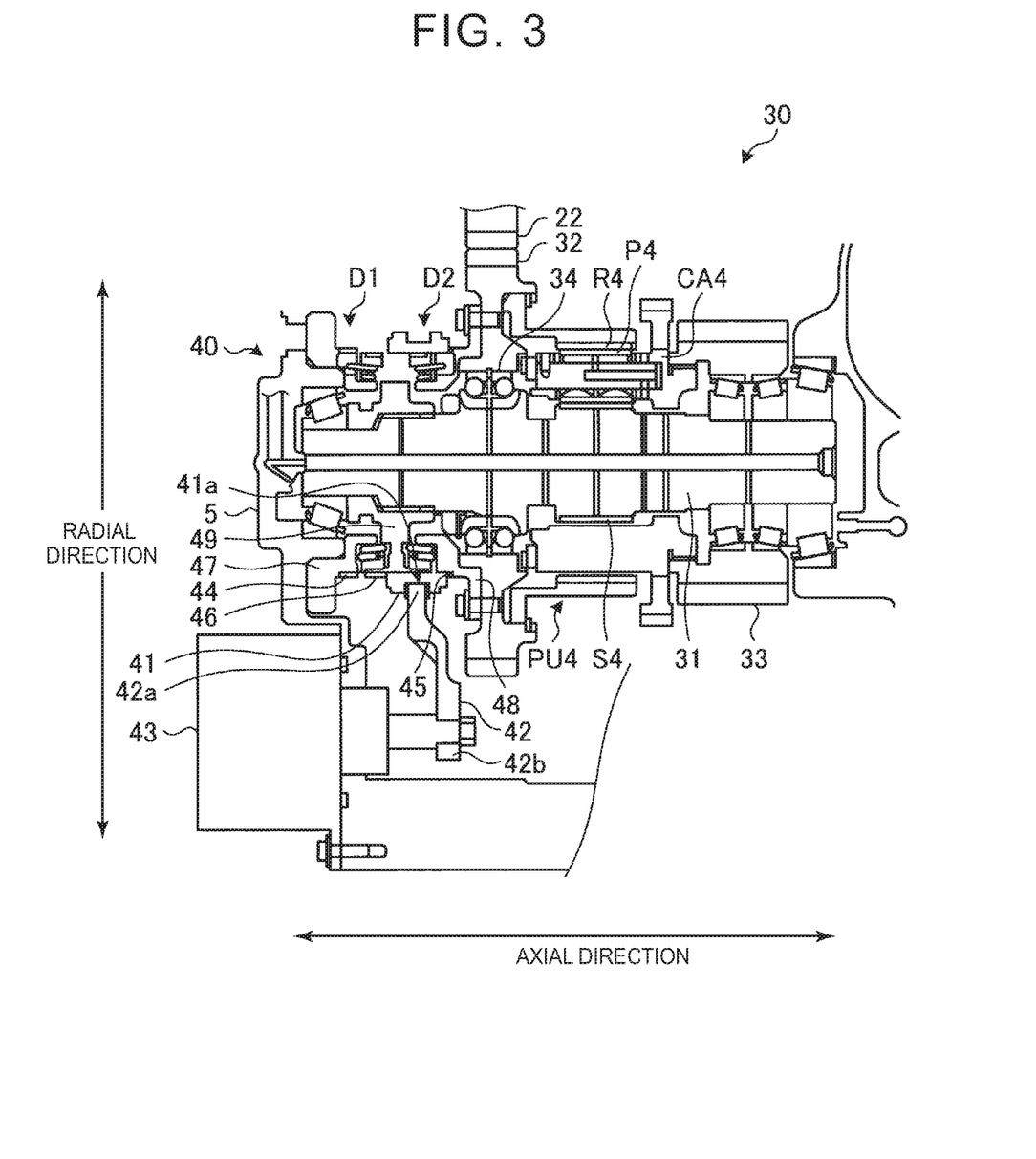
FIG. 3 is an enlarged view of the auxiliary transmission when it is in a High mode.

FIG. 2 is an enlarged view of the auxiliary transmission 30 when it is in a Low mode. FIG. 3 is an enlarged view of the auxiliary transmission 30 when it is in a High mode. As shown in FIG. 2 and FIG. 3, the fourth planetary gear mechanism PU4 that constitutes the auxiliary transmission 30 has a fourth sun gear S4, a fourth ring gear R4 as an internally toothed gear disposed concentrically with the fourth sun gear S4, fourth pinion gears P4 comprised of a pair of gear pairs, which mesh with the fourth sun gear S4 and the fourth ring gear R4, and a fourth carrier CA4 that supports the fourth pinion gears P4 such that the gears P4 can rotate about themselves and about the axis of the fourth planetary gear mechanism PU4. The counter driven gear 32 is provided on an outer circumferential surface of the fourth ring gear R4.

The fourth sun gear S4 is an externally toothed gear that is formed by directly cutting teeth into an outer circumferential surface of the countershaft 31. With the fourth sun gear S4 thus formed by directly cutting teeth into the outer circumferential surface of the countershaft 31, the outside diameter of the fourth sun gear S4 can be reduced, as compared with the case where the fourth sun gear S4 is provided separately from the countershaft 31. As the outside diameter of the fourth sun gear S4 is smaller, the radial dimension of the fourth planetary gear mechanism PU4 can be reduced, and the radial size of the auxiliary transmission 30 can be reduced. Consequently, the size of the automatic transmission 3 can be reduced accordingly.

In the automatic transmission 3 according to this embodiment, the fourth planetary gear mechanism PU4 of the auxiliary transmission 30 is provided between the first planetary gear mechanism PU1 and the second planetary gear mechanism PU2 located adjacent to each other in the direction of the rotational axis (the axial direction) of the main transmission 20, such that a part of the fourth planetary gear mechanism PU4 as viewed in radial directions is located within the main transmission 20, as shown in FIG. 1. With this arrangement, the first planetary gear mechanism PU1, and second planetary gear mechanism PU2 or third planetary gear mechanism PU3 of the main transmission 20 radially overlap with the fourth planetary gear mechanism PU4 of the auxiliary transmission 30, and the radial size of the auxiliary transmission 30 can be reduced, as compared with the case where a part of the fourth planetary gear mechanism PU4 as viewed in radial directions is not located within the main transmission 20. Consequently, the size of the automatic transmission 3 can be reduced accordingly.

The fourth planetary gear mechanism PU4 is located between a counter gear pair CG and a final gear pair FG, in the direction of the rotational axis (axial direction) of the auxiliary transmission 30. The counter gear pair CG consists of the counter drive gear 22 and the counter driven gear 32, and serves to transmit power between the main transmission 20 and the auxiliary transmission 30. The final gear pair FG consists of the final drive gear 33 and the final driven gear 51, and serves to transmit power between the auxiliary transmission 30 and the differential unit 50. With this arrangement, it is possible to save space for a power transmission path from the counter gear pair CG to the final gear pair FG via the fourth planetary gear mechanism PU4.

A radial end portion of the counter driven gear 32, which is opposite to the counter drive gear 22, is in contact with an outer circumferential surface of a bearing 34 that rotatably supports the countershaft 31. With this arrangement, when rotation is received from the counter drive gear 22, radial force applied to the counter driven gear 32 can be received by the bearing 34. Accordingly, a loss in power transmission is less likely or unlikely to arise, due to inclination of the counter driven gear 32 relative to the axial direction, for example.

The Low-High switching mechanism 40 consists of a first dog clutch D1, a second dog clutch D2, an electric actuator 43, and so forth, and is operable to switch the auxiliary transmission 30 between a Low mode and a High mode. In this embodiment, the electric actuator 43 is provided on an axis different from that of the countershaft 31 of the auxiliary transmission 30 as an auxiliary axis, so that the size of the auxiliary transmission 30 in the axial direction is reduced. However, the position at which the electric actuator 43 is provided is not limited to this position. For example, the electric actuator 43 may be provided on the same axis as the countershaft 31.

The first dog clutch D1 consists of a clutch sleeve 41, shift fork 42, first dog teeth 44, third dog teeth 46, and so forth.

The first dog teeth 44 are connected to the case 5 via a support member 47. The first dog teeth 44 are external teeth that protrude radially outward, and the tooth trace extends in the axial direction of the countershaft. The first dog teeth 44 and the third dog teeth 46 are located adjacent to each other, such that the first dog teeth 44 are located on one side of the third dog teeth 46 opposite to the fourth planetary gear mechanism PU4 in the axial direction of the countershaft, and side faces of the dog teeth 44, 46 are opposed to each other, while the outside diameters of the first dog teeth 44 and the third dog teeth 46 are equal to each other.

The third dog teeth 46 are connected to the countershaft 31 via a support member 49. The third dog teeth 46 are external teeth that protrude radially outward, and the tooth trace extends in the axial direction of the countershaft.

The clutch sleeve 41 has fourth dog teeth (not shown) that engage with the first dog teeth 44 and the third dog teeth 46. The fourth dog teeth are internal teeth located at the inner periphery of the clutch sleeve 41, and the tooth trace extends in the axial direction of the countershaft. A groove portion 41a is provided in an outer circumferential surface of the clutch sleeve 41 to extend in the circumferential direction, and a distal end portion 42a of the shift fork 42 is slidably fitted in the groove portion 41a. The shift fork 42 has a proximal end portion 42b fixed to a shaft of the electric actuator 43. With drive force applied from the electric actuator 43 via the shift fork 42, the clutch sleeve 41 moves in the axial direction of the countershaft.

Figure 4:
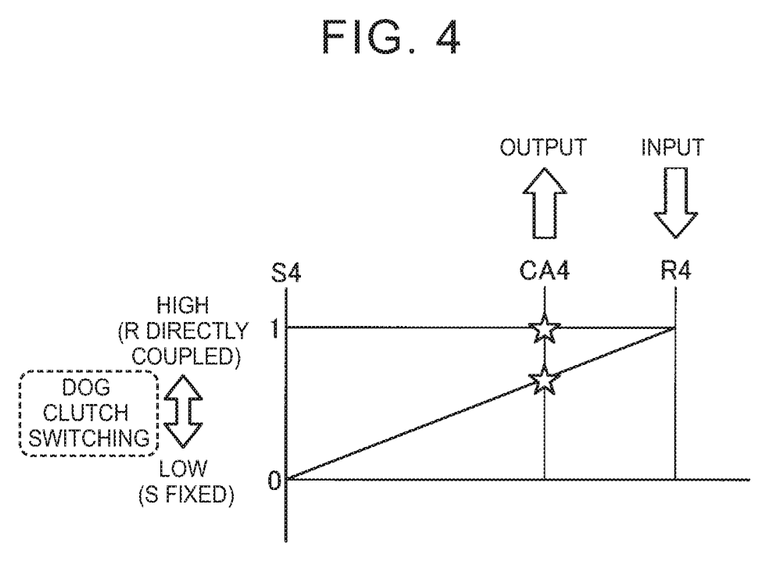
FIG. 4 is a nomographic chart of a fourth planetary gear mechanism.

The first dog clutch D1 can be switched between an engaged state in which the fourth dog teeth of the clutch sleeve 41 engage with the first dog teeth 44 and the third dog teeth 46, and a released state in which the fourth dog teeth engage with the third dog teeth 46 but do not engage with the first dog teeth 44. Then, when the first dog clutch D1 is in the engaged state, the fourth sun gear S4 provided on the countershaft 31 is non-rotatably fixed, and differential rotation of the fourth ring gear R4 and the fourth carrier CA4 is permitted. With this arrangement, as shown in the nomographic chart of FIG. 4, the fourth planetary gear mechanism PU4 is placed in a speed reduction state in which input rotation of the fourth ring gear R4 is subjected to speed reduction and transmitted to the fourth carrier CA4, and then delivered to the final drive gear 33.

The second dog clutch D2 consists of the clutch sleeve 41, shift fork 42 and the third dog teeth 46, which are shared by the first dog clutch D1, and second dog teeth 45, etc.

The second dog teeth 45 are connected to the fourth ring gear R4 via a support member 48. The second dog teeth 45 are external teeth that protrude radially outward, and the tooth trace extends in the axial direction of the countershaft. The second dog teeth 45 are opposed to the first dog teeth 44 in the axial direction of the countershaft, such that the third dog teeth 46 is interposed therebetween. The second dog teeth 45 and the third dog teeth 46 are located adjacent to each other in the axial direction of the countershaft, such that side faces of the dog teeth 45, 46 are opposed to each other, and the outside diameters of the second dog teeth 45 and the third dog teeth 46 are equal to each other.

The second dog clutch D2 can be switched between an engaged state in which the fourth dog teeth of the clutch sleeve 41 engage with the second dog teeth 45 and the third dog teeth 46, and a released state in which the fourth dog teeth engage with the third dog teeth 46 but do not engage with the second dog teeth 45. Then, when the second dog clutch D2 is in the engaged state, the fourth sun gear S4 provided on the countershaft 31 is connected to the fourth ring gear R4, and the fourth ring gear R4, fourth sun gear S4, and the fourth carrier CA4 integrally rotate as a unit. With this arrangement, as shown in the nomographic chart of FIG. 4, the fourth planetary gear mechanism PU4 is placed in a direct coupling state in which input rotation of the fourth ring gear R4 is transmitted to the fourth carrier CA4 at an equal speed, and is delivered to the final drive gear 33.

The Low-High switching mechanism 40 causes the electric actuator 43 to move the shift fork 42, so as to place the first dog clutch D1 in the engaged state, and place the second dog clutch D2 in the released state, thereby to switch the auxiliary transmission 30 to the Low mode. Also, the Low-High switching mechanism 40 causes the electric actuator 43 to move the shift fork 42, so as to place the first dog clutch D1 in the released state, and place the second dog clutch D2 in the engaged state, thereby to switch the auxiliary transmission 30 to the High mode. The electric actuator 43 moves the shift fork 42 when electric current is passed through the actuator 43, and keeps the position of the shift fork 42 when no current is passed through the actuator 43. Therefore, when the shift fork 42 is kept at a position where the first dog clutch D1 or the second dog clutch D2 is placed in the engaged state, no current is passed through the electric actuator 43; therefore, saving of energy can be achieved.

In the Low-High switching mechanism 40, the auxiliary transmission 30 is arranged to be switched between the Low mode and the High mode, by means of the first dog clutch D1 and the second dog clutch D2 as engaging clutches. With this arrangement, it is possible to reduce a dragging loss, which would arise in the case where clutches for switching the auxiliary transmission 30 between the Low mode and the High mode are in the form of frictional engagement elements.

In the automatic transmission 3 according to this embodiment, engagement and release of the first clutch C1 to fourth clutch C4, first brake B1, second brake B2, first dog clutch D1, and the second dog clutch D2 are controlled, so that "1st" to "10th" as forward gear positions and "Rev" as a reverse gear position are formed, as indicated in an engagement table of TABLE 1 below, according to the accelerator operation of the driver, vehicle speed, etc.

TABLE 1

| GEAR | CLUTCH | | | | BRAKE | |
|---|---|---|---|---|---|---|
| POSITION | C1 | C2 | C3 | C4 | B1 | B2 |
| 1st | engaged | released | released | released | released | engaged |
| 2nd | engaged | released | released | released | engaged | released |
| 3rd | engaged | released | engaged | released | released | released |
| 4th | engaged | released | released | engaged | released | released |
| 5th | engaged | engaged | released | released | released | released |
| 6th | released | engaged | released | engaged | released | released |
|  | engaged | released | released | released | released | released |
| 7th | engaged | engaged | released | released | released | released |
| 8th | released | engaged | released | engaged | released | released |
| 9th | released | engaged | engaged | released | released | released |
| 10th | released | engaged | released | released | engaged | released |
| Rev | released | released | engaged | released | released | engaged |

| GEAR | DOG CLUTCH | |
|---|---|---|
| POSITION | D1 | D2 |
| 1st | engaged | released |
| 2nd | engaged | released |
| 3rd | engaged | released |
| 4th | engaged | released |
| 5th | engaged | released |
| 6th | engaged | released |
|  | released | engaged |
| 7th | released | engaged |
| 8th | released | engaged |
| 9th | released | engaged |

TABLE 1-continued

| 10th | released | engaged |
| Rev | engaged | released |

As is understood from TABLE 1, in the automatic transmission 3 according to this embodiment, the auxiliary transmission 30 is set to be able to form the 6th-speed gear position "6th" in both the Low mode and the High mode. Then, as indicated in the engagement table of TABLE 1 above, each of the 1st-speed to 6th-speed gear positions "1st" to "6th" is formed with the auxiliary transmission 30 fixed in the Low mode, and each of the 6th-speed to 10th-speed gear positions "6th" to "10th" is formed with the auxiliary transmission 30 switched from the Low mode to the High mode and fixed in the High mode.

Also, the Low-High required ratio of the fourth planetary gear mechanism PU4 provided in the auxiliary transmission 30 is in the range of 0.90 to 1.50; therefore, the size of the fourth planetary gear mechanism PU4 can be reduced. Thus, in the automatic transmission 3 according to this embodiment, as indicated in TABLE 2 below, the Low-High required ratio of the fourth planetary gear mechanism PU4 is set to 1.49, so that the size of the fourth planetary gear mechanism PU4 is reduced, and, consequently, the size of the automatic transmission 3 is reduced.

TABLE 2

| AUXILIARY TRANSMISSION | LOW | HIGH |
|---|---|---|
| LOW-HIGH REQUIRED RATIO | | 1.49 |
| SPREAD | | 12.24 |
| 1st | 5.52 | |
| 2nd | 3.18 | |
| 3rd | 2.05 | |
| 4th | 1.49 | |
| 5th | 1.24 | |
| 6th | 1.00 | 1.00 |
| 7th | | 0.83 |
| 8th | | 0.67 |
| 9th | | 0.54 |
| 10th | | 0.45 |

An automatic transmission as a second embodiment of the disclosure will be described. The basic configuration of the automatic transmission according to this embodiment is substantially identical with that of the automatic transmission 3 according to the first embodiment, and thus will not be described herein. The automatic transmission 3 according to the second embodiment has 1st-speed to 16th-speed gear positions "1st" to "16th" as forward gear positions, and reverse gear positions "Rev1", "Rev2".

In the main transmission 20 provided in the automatic transmission 3 according to this embodiment, engagement and release of the first clutch C1 to fourth clutch C4, first brake B1, and the second brake B2 are controlled, so that each of forward 1st-speed to 8th-speed gear positions and a reverse gear position is formed, as indicated in an engagement table of TABLE 3 below, according to the accelerator operation of the driver, vehicle speed, etc.

TABLE 3

| GEAR | CLUTCH | | | | BRAKE | |
|---|---|---|---|---|---|---|
| POSITION | C1 | C2 | C3 | C4 | B1 | B2 |
| FORWARD 1st | engaged | released | released | released | released | engaged |
| FORWARD 2nd | engaged | released | released | released | engaged | released |

TABLE 3-continued

| GEAR POSITION | CLUTCH | | | | BRAKE | |
|---|---|---|---|---|---|---|
| | C1 | C2 | C3 | C4 | B1 | B2 |
| FORWARD 3rd | engaged | released | engaged | released | released | released |
| FORWARD 4th | engaged | released | released | engaged | released | released |
| FORWARD 5th | engaged | engaged | released | released | released | released |
| FORWARD 6th | released | engaged | released | engaged | released | released |
| FORWARD 7th | released | engaged | engaged | released | released | released |
| FORWARD 8th | released | engaged | released | released | engaged | released |
| REVERSE | released | released | engaged | released | released | engaged |

Also, in the automatic transmission 3 according to this embodiment, as indicated in TABLE 4 below, the 1st-speed to 16th-speed gear positions "1st" to "16th" are sequentially formed, by sequentially switching the main transmission 20 from the forward 1st-speed gear position to the forward 8th-speed position, while alternately switching the auxiliary transmission 30 between the Low mode and the High mode by means of the Low-High switching mechanism 40. For example, "1st" is formed with the forward 1st-speed gear position and the Low mode, and "2nd" is formed with the forward 1st-speed gear position and the High mode, while "3rd" is formed with the forward 2nd-speed gear position and the Low mode, and "4th" is formed with the forward 2nd-speed gear position and the High mode. Also, in the automatic transmission 3, each of the gear positions "Rev1" and "Rev2" is formed by placing the main transmission 20 in the reverse gear position, and switching the auxiliary transmission 30 between the Low mode and the High mode.

TABLE 4

| GEAR POSITION | CLUTCH | | | | BRAKE | |
|---|---|---|---|---|---|---|
| | C1 | C2 | C3 | C4 | B1 | B2 |
| 1st | engaged | released | released | released | released | engaged |
| 2nd | engaged | released | released | released | released | engaged |
| 3rd | engaged | released | released | released | engaged | released |
| 4th | engaged | released | released | released | engaged | released |
| 5th | engaged | released | engaged | released | released | released |
| 6th | engaged | released | engaged | released | released | released |
| 7th | engaged | released | released | engaged | released | released |
| 8th | engaged | released | released | engaged | released | released |
| 9th | engaged | engaged | released | released | released | released |
| 10th | engaged | engaged | released | released | released | released |
| 11th | released | engaged | released | engaged | released | released |
| 12th | released | engaged | released | engaged | released | released |
| 13th | released | engaged | engaged | released | released | released |
| 14th | released | engaged | engaged | released | released | released |
| 15th | released | engaged | released | released | engaged | released |
| 16th | released | engaged | released | released | engaged | released |
| Rev1 | released | released | engaged | released | released | engaged |
| Rev2 | released | released | engaged | released | released | engaged |

| GEAR POSITION | DOG CLUTCH | |
|---|---|---|
| | D1 | D2 |
| 1st | engaged | released |
| 2nd | released | engaged |
| 3rd | engaged | released |
| 4th | released | engaged |
| 5th | engaged | released |
| 6th | released | engaged |

TABLE 4-continued

| 7th | engaged | released |
| 8th | released | engaged |
| 9th | engaged | released |
| 10th | released | engaged |
| 11th | engaged | released |
| 12th | released | engaged |
| 13th | engaged | released |
| 14th | released | engaged |
| 15th | engaged | released |
| 16th | released | engaged |
| Rev1 | engaged | released |
| Rev2 | released | engaged |

As a method of shifting the automatic transmission 3 among the gear positions "1st" to "16th", it may be considered to form each of the gear positions "1st" to "8th", by sequentially switching the main transmission 20 from the forward 1st-speed gear position to the forward 8th-speed gear position, while placing the auxiliary transmission 30 in the Low mode, and form each of the gear positions "9th" to "16th", by sequentially switching the main transmission 20 from the forward 1st-speed gear position to the forward 8th-speed gear position, while placing the auxiliary transmission 30 in the High mode. However, in order to implement this shifting method, it is necessary to significantly reduce the speed of rotation in the fourth planetary gear mechanism PU4 of the auxiliary transmission 30. As a result, the size of the fourth planetary gear mechanism PU4 is increased, which makes it difficult to reduce the size of the automatic transmission 3.

For example, as indicated in TABLE 5 below, when the automatic transmission 3 is shifted from "8th" (forward 1st-speed+Low mode) to "9th" (forward 1st-speed+High mode), the gear ratio must be changed from 5.52 to 0.62 in the fourth planetary gear mechanism PU4 of the auxiliary transmission 30. In this case, the Low-High required ratio required of the fourth planetary gear mechanism PU4 is equal to 0.11, resulting in increase in the size of the fourth planetary gear mechanism PU4.

TABLE 5

| AUXILIARY TRANSMISSION | LOW | HIGH |
|---|---|---|
| LOW-HIGH REQUIRED RATIO | | 0.11 |
| SPREAD | | 73.98 |
| 1st | 5.52 | |
| 2nd | 3.18 | |
| 3rd | 2.05 | |
| 4th | 1.49 | |
| 5th | 1.24 | |
| 6th | 1.00 | |
| 7th | 0.80 | |
| 8th | 0.67 | |
| 9th | | 0.62 |
| 10th | | 0.35 |
| 11th | | 0.23 |
| 12th | | 0.17 |
| 13th | | 0.14 |
| 14th | | 0.11 |
| 15th | | 0.09 |
| 16th | | 0.08 |

Therefore, in the automatic transmission 3 according to this embodiment, as indicated in TABLE 6 below, the Low-High required ratio of the fourth planetary gear mechanism PU4 is set to 0.90. so that the fourth planetary gear mechanism PU4 is less likely or unlikely to be large-sized.

TABLE 6

| AUXILIARY TRANSMISSION | LOW | HIGH |
|---|---|---|
| LOW-HIGH REQUIRED RATIO | | 0.90 |
| SPREAD | | 9.11 |
| 1st | 5.52 | |
| 2nd | | 4.97 |
| 3rd | 3.18 | |
| 4th | | 2.87 |
| 5th | 2.05 | |
| 6th | | 1.85 |
| 7th | 1.49 | |
| 8th | | 1.34 |
| 9th | 1.24 | |
| 10th | | 1.11 |
| 11th | 1.00 | |
| 12th | | 0.90 |
| 13th | 0.80 | |
| 14th | | 0.72 |
| 15th | 0.67 | |
| 16th | | 0.61 |

In this connection, if the fourth planetary gear mechanism PU4 that is small-sized such that the Low-High required ratio of the fourth planetary gear mechanism PU4 is equal to 0.90 is used, the gear ratio cannot be largely changed even if the auxiliary transmission 30 is switched between the Low mode and the High mode by means of the Low-High switching mechanism 40. On the other hand, if the Low-High required ratio of the fourth planetary gear mechanism PU4 is in the range of 0.90 to 1.50, the method of sequentially shifting the automatic transmission 3 to an adjacent gear position while switching the auxiliary transmission 30 to the High mode and fixing the auxiliary transmission 30 in the High mode, after sequentially shifting it to an adjacent gear position while fixing the auxiliary transmission 30 in the Low mode, and the method of shifting the transmission 3 to an adjacent gear position while alternately switching the auxiliary transmission 30 between the Low mode and the High mode, can be selected, depending on the number of the gear positions possessed by the automatic transmission 3. Therefore, as indicated in TABLE 6 above, for example, when the automatic transmission 3 according to this embodiment is shifted to an adjacent gear position, the auxiliary transmission 30 is alternately switched between the Low mode and the High mode, using the Low-High switching mechanism 40. Thus, it is possible to shift the automatic transmission 3, without significantly changing the gear ratio in the fourth planetary gear mechanism PU4.

What is claimed is:

1. An automatic transmission comprising:
  a main transmission including a plurality of main-transmission-side planetary gear mechanisms;
  an auxiliary transmission having a rotational axis that is different from a rotational axis of the main transmission, the auxiliary transmission including an auxiliary-transmission-side planetary gear mechanism, a first clutch, and a second clutch;
  the auxiliary-transmission-side planetary gear mechanism including a sun gear, a ring gear configured to receive power from the main transmission, and a carrier configured to deliver the power,
  the sun gear, the ring gear and the carrier of the auxiliary-transmission-side planetary gear mechanism being provided between a pair of main-transmission-side planetary gear mechanisms included in the plurality of main-transmission-side planetary gear mechanisms and located adjacent to each other in a direction of the rotational axis of the main transmission, and a part of the auxiliary-transmission-side planetary gear mechanism radially overlaps the main transmission,
  the first clutch being configured to fix the sun gear of the auxiliary-transmission-side planetary gear mechanism,
  the second clutch being configured to connect the ring gear with the sun gear,
  the auxiliary-transmission-side planetary gear mechanism is located between a counter gear pair and a final gear pair in the direction of the rotational axis of the auxiliary transmission, and
  at least a portion from a tooth portion of the ring gear of the auxiliary-transmission-side planetary gear mechanism to a tooth portion of the counter gear pair on a ring gear side via an outer circumferential surface overlaps at least one of the main-transmission-side planetary gear mechanisms of the main transmission; and
  a Low-High switching mechanism configured to switch the auxiliary transmission between a Low mode and a High mode, by selectively releasing the first clutch and the second clutch, the Low-High switching mechanism being configured to switch the auxiliary transmission between the Low mode and the High mode when a gear position of the automatic transmission is a 6th-speed gear position, wherein
  the gear position of the automatic transmission is set to one gear position selected from 1st-speed to 6th-speed gear positions when the auxiliary transmission is in the Low mode, and is set to one gear position selected from 6th-speed to 10th-speed gear positions when the auxiliary transmission is in the High mode.

2. The automatic transmission according to claim 1, wherein
  each of the first clutch and the second clutch are a dog clutch.

3. The automatic transmission according to claim 2, further comprising
  an electric actuator configured to switch the dog clutch between an engaged state and a released state.

* * * * *